United States Patent [19]

Fenneman et al.

[11] 4,151,393
[45] Apr. 24, 1979

[54] LASER PILE CUTTER

[75] Inventors: David B. Fenneman, Fredericksburg, VA; Robert J. Geres, China Lake, Calif.

[73] Assignee: The United States of America as represented by the Secretary of the Navy, Washington, D.C.

[21] Appl. No.: 876,953

[22] Filed: Feb. 13, 1978

[51] Int. Cl.² .............................................. B23K 9/00
[52] U.S. Cl. .............................................. 219/121 L
[58] Field of Search .... 219/121 L, 121 LM, 121 EM, 219/121 EB, 121 UW

[56] References Cited

U.S. PATENT DOCUMENTS

| 3,581,042 | 5/1971 | Pilia | 219/DIG. UW |
| 3,671,707 | 3/1971 | Cunningham | 219/DIG. UW |
| 3,837,171 | 4/1973 | Scurlock | 219/DIG. UW |

Primary Examiner—J. V. Truhe
Assistant Examiner—Fred E. Bell

[57] ABSTRACT

A method and apparatus for cutting wharf or bridge pilings underwater which utilizes a neutrally buoyant air tube to conduct a laser beam from a laser source on a barge or other surface vessel to an air filled collar which is clamped to the piling to be cut. The laser beam is guided via the air tube to the piling where laser energy and combustion are utilized to cut the pile, and compressed air or other gases purge the collar of smoke and water during the cutting.

6 Claims, 6 Drawing Figures

LASER PILE CUTTER

BACKGROUND OF THE INVENTION

1. Field of the Invention

Personnel in the underwater industry such as the oil industry and the Navy have a need for an improved method for cutting pilings at or near the mudline with attendant requirements for (a) diver transportability, (b) operation in zero visibility conditions, (c) positive, diver activated safety controls.

2. Description of the Prior Art

At the present time, the usual method is to employ a hydraulic chain saw which is operated by a diver underwater to cut the piling at or near the mudline. The piling may be wood, iron or concrete or other suitable material which is used as a structural support for wharfs, bridges, etc. However, the hydraulic chain saw represents a diver hazard in low visibility surroundings.

Another technique for cutting pilings involves the use of explosives however, for various reasons these are not suitable in many operations.

SUMMARY OF THE INVENTION

The laser piling cutter consists of a high energy laser, for example a 1 kilowatt commercially available $CO_2$ laser, an approximately neutrally buoyant beam air tube which carries the laser beam and pressurized air (or other gas mixture) to the cutting site, and a removable collar which is fitted around the piling to seal off the cutting area.

DESCRIPTION OF THE PREFERRED EMBODIMENTS

Figure 1:
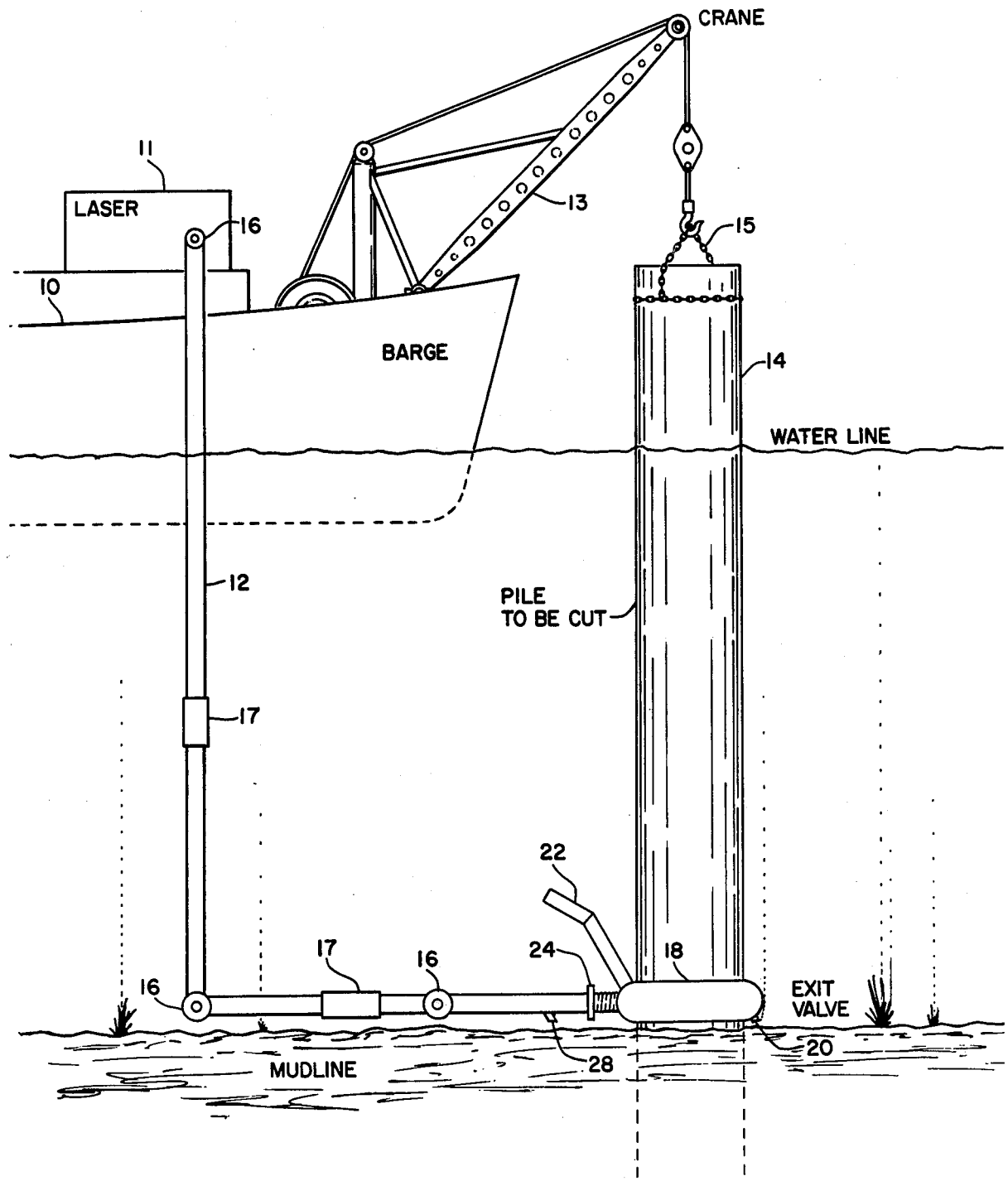
FIG. 1 is an overall diagrammatic view of the general setup for cutting pilings.

FIG. 1 is an overall diagrammatic showing of one embodiment of the apparatus in place on a piling. A barge or other surface vessel 10 is used to mount the laser transmitter 11 which has coupled thereto a water tight neutrally buoyant tube 12. In developmental models a 1 kilowatt continuous wave $CO_2$ laser, such as GTE Sylvania model 971, has proven to be satisfactory. The barge also carries a crane 13 which is attached by means of a cable or chain apparatus 15 to a piling to be cut.

The tube 12 which carries the laser beam and compressed air is jointed at various places by means of wrists as at 16. The tube is also jointed as at 17 to allow longitudinal movement. The joints at 16 and 17 are conventional mechanical means for providing longitudinal and rotary movement and form no part of the present invention and, therefore are not illustrated in detail. The inner surfaces of tube 12 and joints 16 and 17 are reflective to facilitate transmission of the laser beam.

In order to provide a water-free zone in the area of the cutting, a collar 18 is clamped around the pile. Collar 18 has an exit valve 20 on the lower surface thereof for purging water from the interior of the collar. Collar 18 also has a viewing telescope 22 attached thereto so that a diver may observe the cutting action in the zone. The laser transmitting tube 12 is coupled to the collar 18 by means of a joint 24, which allows the laser beam to be moved across the cutting zone.

Figure 2:
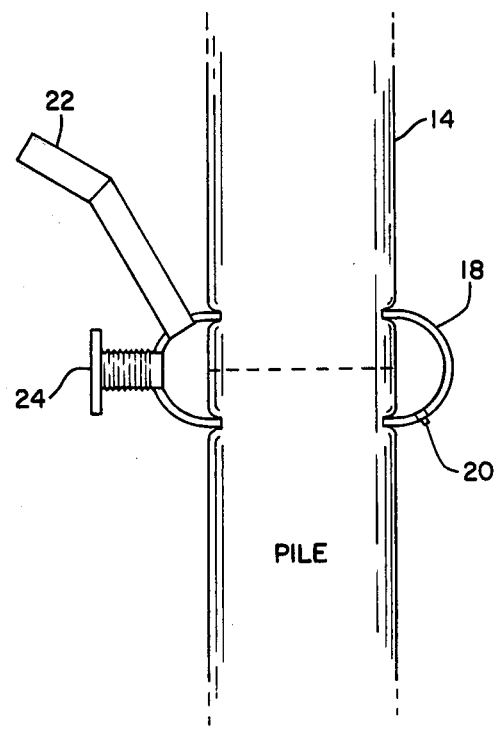
FIG. 2 is a side elevation in cross section of a collar in place on the piling.
Figure 3:
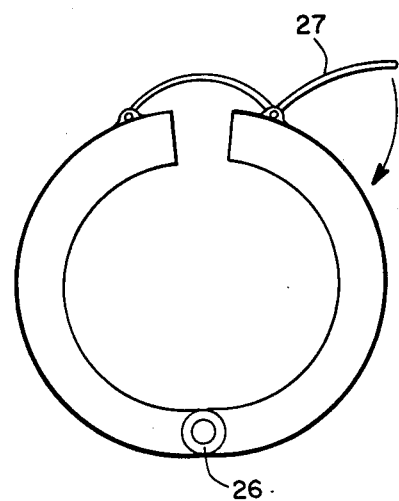
FIG. 3 is a plan view of a collar.

FIGS. 2 and 3 show the collar in greater detail. The collar is hinged at 26, and a clamping lever 27 is positioned directly opposite on the collar for clamping the collar in place around the piling. Collar 18 is somewhat like the bands which hold the tops on barrels and cinches around the pile, cutting into the circumference above and below the plane to be cut, thereby sealing out water. Joint 24, which is shown in FIG. 2, incorporates a flexible bellows to allow scan of the laser beam across the surface of the piling to be cut and to allow forward movement of tube 12 to keep the laser focused as the piling is penetrated.

Figure 4:
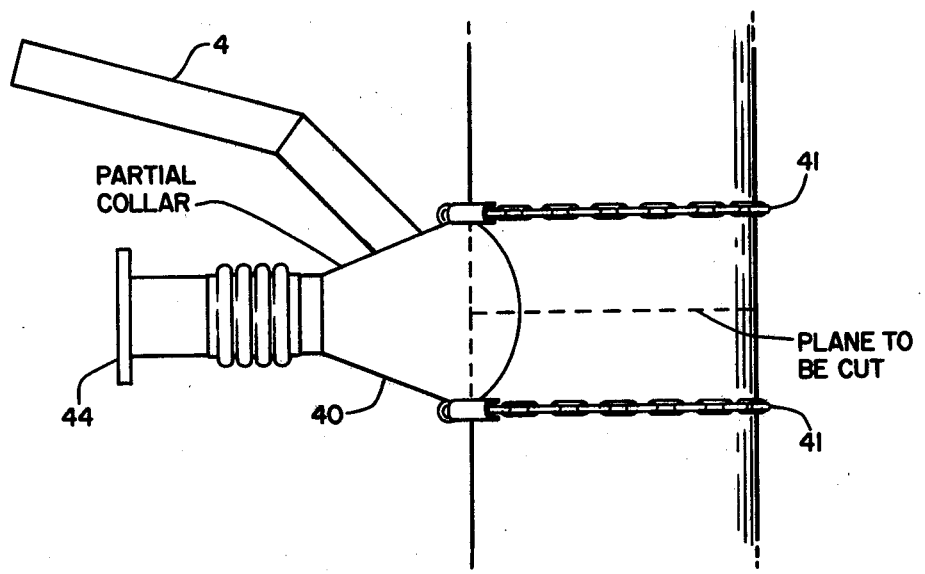
FIG. 4 is an alternate embodiment in cross section showing a partial collar in place on a piling.
Figure 5:
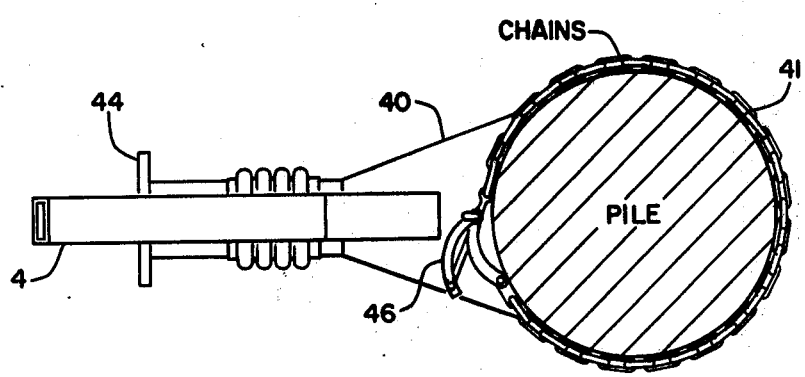
FIG. 5 is a plan view of the embodiment of FIG. 4.

FIG. 4 is a side elevation showing another embodiment of the invention which incorporates a partial collar 40 which is secured against the piling by means of chains 41. A viewing tube 42 is again provided so that the diver can watch the action of the laser beam on the piling and direct the beam to the proper location. A joint 44 is also provided to couple the laser tube to the partial collar. Again, the joint may incorporate a flexible bellows to allow the laser beam to be moved across the surface of the piling to be cut. As with the embodiment of FIGS. 1 to 3, the partial collar is clamped to the piling by means of a clamping lever 46, shown in FIG. 5.

Figure 6:
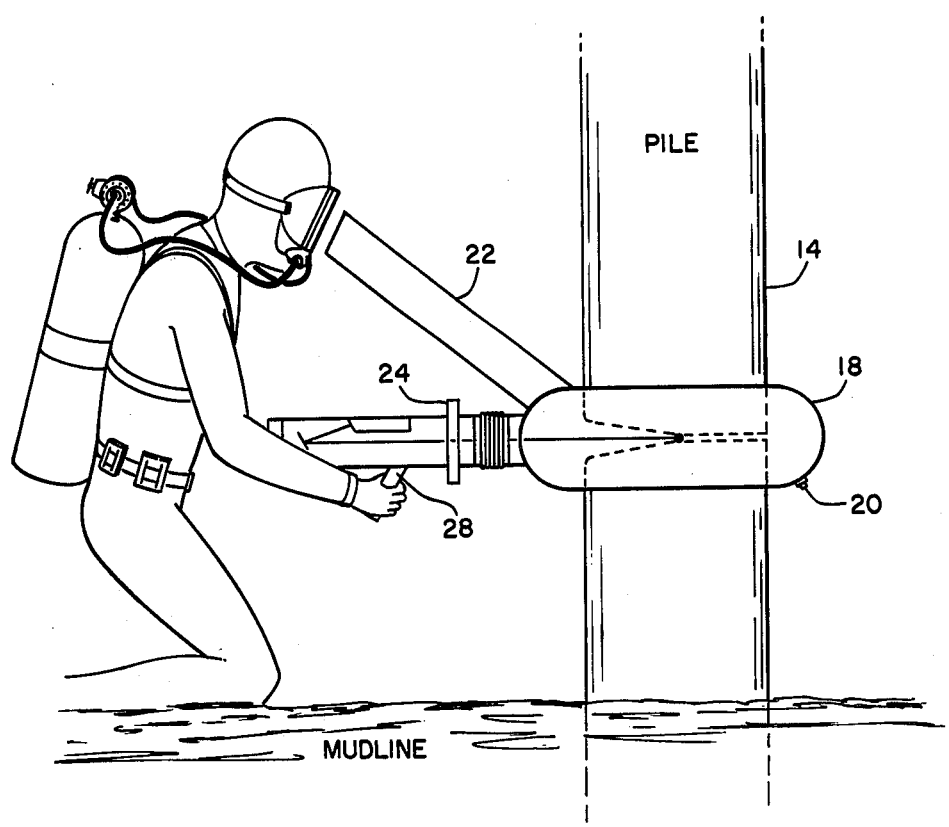
FIG. 6 is a diagrammatic showing of a diver operating one embodiment of the invention.

FIG. 6 is an overall view showing a diver using the apparatus of the embodiments of FIGS. 1 to 3. The diver directs the laser beam across the cut in the piling by means of a beam director handle 28.

In operation, the diver attaches the collar to a piling and then couples the beam tube 12 to the collar 18 and purges water from the collar interior by means of air flowing through tube 12 at a pressure a few psi above the ambient pressure.

The diver commences the cutting operation by pressing on a conventional trigger switch in the beam director handle 28, which triggers on the laser transmitter 11 on the barge 10. Another trigger or button on the handle could be used to direct high speed air on the piling where the laser beam is focused. The high speed air burns the pile wood locally and clears the smoke from the surface of the piling so that the diver may view the cutting action.

In cutting steel piles, a jet of oxygen is directed against the spot on which the laser beam is focused, and the action is much like an oxyacetylene cutting torch. The laser energy is not primarily the source of cutting but provides local heating which produces selective burning. The pile essentially provides its own fuel for burning. The system is simple and consists of off the self industrial components such as a $CO_2$ laser of about 1 kilowatt power, the beam tube which carries the laser beam and low pressure air and high pressure air or other gas to the cutting site and a removable collar or partial collar which is fitted around a piling to seal the cutting area.

Such a system provides many advantages, among which are that no electrical or hydraulic power lines are required, with the attendant hazards. There is a minimum of diver exertion and the diver is not required to hold high speed rotating machinery against the piling.

The apparatus is light weight with, the collar and beam director should weighing less than 50 pounds. The diver has positive on-sight control of the laser beam and air supply; and there is no need of outside illumination in that the operation is self luminous, so that the diver has the ability to visually monitor and control the cutting process.

Also, during the cutting the fact that the piling is secured by a crane on a barge and the collar means that the pile will not slip during or after the cutting process. In addition, laser energy will not pass through water so in the unlikly event the beam somehow gets loose, the water will absorb it. Thus, the area is safe for other workers.

It is not necessary to have the diver at the site during the cutting process, which could be directed at the surface, however, this would be a more expensive operation.

The present method can be used for iron or concrete pilings; the only requirement being the need for a larger laser. However, there is much experience in laser cutting of metals and other materials at this time.

Other underwater construction procedures such as hole drilling, butt welding, etc. could be performed by the present apparatus or a simple modification thereof.

What is claimed is:

1. Apparatus for cutting pilings underwater by means of a laser beam comprising;
    essentially watertight means for surrounding at least a portion of the piling to be cut;
    coupling means associated with said watertight means for coupling conduit means thereto;
    said conduit means being capable of carrying a laser beam;
    purging means associated with said essentially watertight means for purging water from the interior of said watertight means in communication with the piling to be cut;
    said conduit means also including means for directing a gas jet into the water-free zone to maintain the zone clear of smoke and debris during the cutting operation.

2. An apparatus for cutting pilings as set forth in claim 1 wherein;
    said means for providing an essentially water-free zone comprises a collar for encircling said piling.

3. Apparatus for cutting pilings underwater as set forth in claim 1 wherein;
    said means for maintaining an essentially water-free zone comprises at least a portion of a watertight barrier adapted to be secured to the piling.

4. An apparatus for cutting pilings underwater as set forth in claim 2 and further including;
    viewing means attached to said means for maintaining an essentially water-free zone so that a diver may observe the cutting action on the piling.

5. An apparatus for cutting pilings underwater as set forth in claim 1 and further including;
    exit valve means in said collar to allow escape of water from said zone.

6. An apparatus for cutting pilings underwater as set forth in claim 1 wherein;
    said conduit means is coupled to said means for maintaining an essentially water-free zone by means of a coupling such that the laser beam may be moved across the piling in the cutting zone.

* * * * *